(12) United States Patent
Peterson et al.

(10) Patent No.: US 10,212,263 B2
(45) Date of Patent: Feb. 19, 2019

(54) NOTIFYING A USER OF EXTERNAL AUDIO (71) Applicant: LENOVO (Singapore) PTE. LTD., New Tech Park (SG)

(72) Inventors: Nathan J. Peterson, Oxford, NC (US); John Scott Crowe, Durham, NC (US); Gary David Cudak, Wake Forest, NC (US); Jennifer Lee-Baron, Morrisville, NC (US); Amy Leigh Rose, Chapel Hill, NC (US); Bryan Loyd Young, Tualatin, OR (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/406,905

(22) Filed: Jan. 16, 2017

(65) Prior Publication Data
US 2018/0205812 A1 Jul. 19, 2018

(51) Int. Cl.
*H03G 5/00* (2006.01)
*H04M 1/60* (2006.01)
*G06F 3/16* (2006.01)
*G10L 15/26* (2006.01)
*G10L 25/48* (2013.01)

(52) U.S. Cl.
CPC .......... *H04M 1/6058* (2013.01); *G06F 3/167* (2013.01); *G10L 15/26* (2013.01); *G10L 25/48* (2013.01); *H04M 2201/41* (2013.01)

(58) Field of Classification Search
USPC .......... 381/26, 74, 81, 91, 92, 104, 122, 123
See application file for complete search history.

(56) References Cited

U.S. PATENT DOCUMENTS

| 6,813,777 B1* | 11/2004 | Weinberger ........ H04B 7/18508 348/E5.008 |
| 8,918,468 B1* | 12/2014 | Fisher ................. H04M 3/5191 705/319 |
| 9,247,014 B1* | 1/2016 | Rao .................... G06F 17/30979 |
| 2008/0089530 A1* | 4/2008 | Bostick .................... H03G 3/32 381/74 |

* cited by examiner

Primary Examiner — Yosef K Laekemariam
(74) Attorney, Agent, or Firm — Kunzler, PC (57) ABSTRACT

Apparatuses, methods, systems, and program products are disclosed for delaying notification delivery based on user activity. A method includes detecting, by a processor, an external sound using a microphone, determining that the external sound comprises a message that is of interest to the user, and notifying the user of the message in response to determining that the message is of interest to the user.

17 Claims, 5 Drawing Sheets

NOTIFYING A USER OF EXTERNAL AUDIO

FIELD

The subject matter disclosed herein relates to detecting external sounds and more particularly relates to notifying an user of external sounds.

BACKGROUND

Users can use private listening devices, such as headphones, to listen to audio output from their smart devices for music, videos, games, or the like. However, if a user needs to hear announcements or other information that is provided audibly, the user may not be able to enjoy their music, videos, or games using their private listening devices for fear of not hearing the announcements.

BRIEF SUMMARY

An apparatus for notifying a user of external audio is disclosed. A method and computer program product also perform the functions of the apparatus. In one embodiment, an apparatus includes a microphone, a processor, and a memory that stores code executable by the processor. In certain embodiments, the code is executable by the processor to detect an external sound using the microphone. In a further embodiment, the code is executable by the processor to determine that the external sound comprises a message that is of interest to the user. In some embodiments, the code is executable by the processor to notify the user of the message in response to determining that the message is of interest to the user.

In one embodiment, the code is further executable by the processor to notify the user of the message by outputting the message through a private listening device that the user is using to listen to a different audio source. In some embodiments, the code is further executable by the processor to record the message in response to determining the message is of interest to the user. The recorded message may be output to the private listening device.

In various embodiments, the code is further executable by the processor to transcribe the message and electronically present the transcribed message to the user. In one embodiment, the code is further executable by the processor to interrupt one or more active applications prior to notifying the user of the message. In a further embodiment, the code is further executable by the processor to interrupt the one or more applications by one or more of pausing the one or more applications, reducing a volume level associated with the one or more applications, and turning off a display.

In some embodiments, the code is further executable by the processor to notify the user of the message by generating one or more of a vibration and an alarm. In certain embodiments, the code is further executable by the processor to determine the user's location and determine that the user's location is related to the message to determine that the message is of interest to the user.

In various embodiments, the code is further executable by the processor to check the user's calendar for one or more events and determine that the one or more events are related to the message to determine that the message is of interest to the user. In one embodiment, the code is further executable by the processor to detect one or more keywords of the message to determine that the message is of interest to the user.

In one embodiment, the external sound is selected from the group consisting of an announcement over a public address system, a person's voice, and music. In a further embodiment, the external sound comprises a predefined sound that is associated with a specific message. The predefined sound may be used to lookup the specific message.

A method, in one embodiment, includes detecting, by a processor, an external sound using a microphone. In a further embodiment, the method includes determining that the external sound comprises a message that is of interest to the user. In some embodiments, the method includes notifying the user of the message in response to determining that the message is of interest to the user.

In one embodiment, the method includes notifying the user of the message by outputting the message through a private listening device that the user is using to listen to a different audio source. In a further embodiment, the method includes recording the message in response to determining the message is of interest to the user, the recorded message being output to the private listening device.

In various embodiments, the method includes transcribing the message, and electronically presenting the transcribed message to the user. In some embodiments, the method includes interrupting one or more active applications prior to notifying the user of the message.

In some embodiments, the method includes determining the user's location, and determining that the user's location is related to the external sound to determine that the message is of interest to the user. In a further embodiment, the method includes checking the user's calendar for one or more events, and determining that the one or more events are related to the message to determine that the message is of interest to the user.

A program product, in one embodiment, includes a computer readable storage medium that stores code executable by a processor. In some embodiments, the executable code includes code to perform detecting an external sound using a microphone. In a further embodiment, the executable code includes code to perform determining that the external sound comprises a message that is of interest to the user. In certain embodiments, the executable code includes code to perform notifying the user of the message in response to determining that the message is of interest to the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
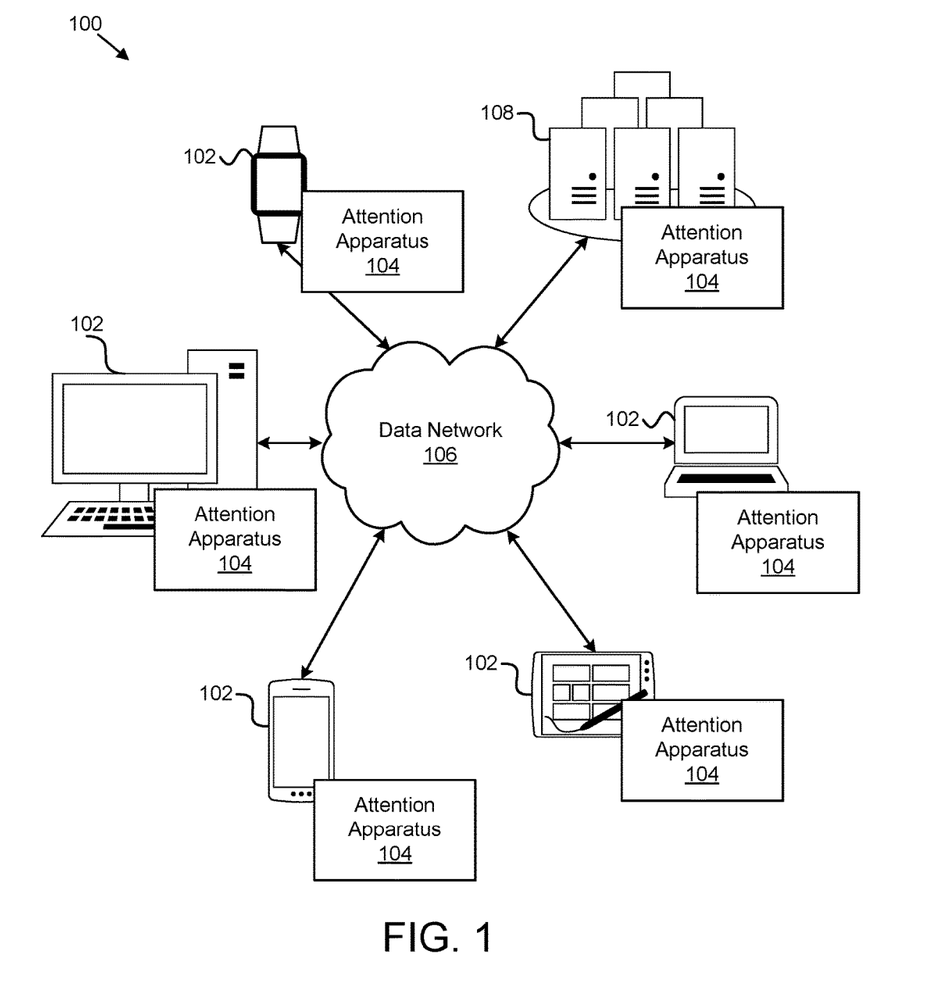
FIG. 1 is a schematic block diagram illustrating one embodiment of a system for notifying a user of external audio.

FIG. 1 is a schematic block diagram illustrating one embodiment of a system 100 for notifying a user of external audio. In one embodiment, the system 100 includes one or more information handling devices 102, one or more attention apparatuses 104, one or more data networks 106, and one or more servers 108. In certain embodiments, even though a specific number of information handling devices 102, attention apparatuses 104, data networks 106, and servers 108 are depicted in FIG. 1, one of skill in the art will recognize, in light of this disclosure, that any number of information handling devices 102, attention apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more sensors for detecting audio, e.g., a microphone, lights, e.g., a camera, and/or the like.

In one embodiment, the attention apparatus 104 is configured to detect an external sound, meaning a sound external to sound produce by a user's device, and determine whether the external sound is relevant to the user. If so, the attention apparatus 104 may notify the user of the external sound. For example, while a user is in an airport and is listening to music output by his device using headphones, the attention apparatus 104 may detect an external sound over the public address ("PA") system that is an announcement associated with the user's flight. Because the user is using his headphones, he may not hear the announcement; however, the attention apparatus 104 can notify the user of the announcement, in various ways described below. In this manner, the attention apparatus 104 can alert the user to messages, notifications, or other information that may be provided audibly, but may not be noticed due to the user not paying attention, having headphones on, talking on the phone, or the like. The attention apparatus 104, including its various sub-modules, may be located on one or more information handling devices 102 in the system 100, one or more servers 108, one or more network devices, one or more security systems, and/or the like. The attention apparatus 104 is described in more detail below with reference to FIGS. 2 and 3.

In one embodiment, the attention apparatus 104 improves the usability of the device by allowing a user to continue using the device normally, such as by listening to music, watching videos, talking on the phone, etc., without worrying about missing an announcement or other information that is provided audibly. Otherwise, users would be required to turn down the volume, not use headphones, avoid phone calls, or the like.

In various embodiments, the attention apparatus 104 may be embodied as a hardware appliance that can be installed or deployed on an information handling device 102, on a server 108, or elsewhere on the data network 106. In certain embodiments, the attention apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the attention apparatus 104 may include a power interface, a wired and/or wireless network interface, a graphical interface that attaches to a display, and/or a semiconductor integrated circuit device as described below, configured to perform the functions described herein with regard to the attention apparatus 104.

The attention apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the attention apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the attention apparatus 104.

The semiconductor integrated circuit device or other hardware appliance of the attention apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the attention apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like.

Figure 2:
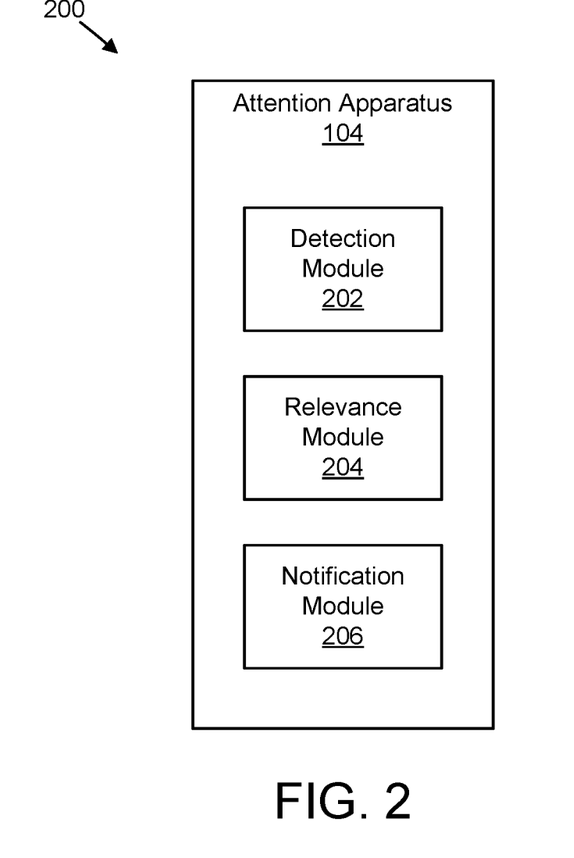
FIG. 2 is a schematic block diagram illustrating one embodiment of an apparatus for notifying a user of external audio.

FIG. 2 is a schematic block diagram illustrating one embodiment of an apparatus 200 for notifying a user of external audio. In one embodiment, the apparatus 200 includes an embodiment of an attention apparatus 104. The attention apparatus 104, in some embodiments, includes one or more of a detection module 202, a relevance module 204, and a notification module 206, which are described in more detail below.

The detection module 202, in one embodiment, is configured to detect an external sound. As used herein, an external sound is a sound that is external to sounds produced by a user's device. For example, PA announcements may be considered external sounds compared to sounds associated with videos, music, phone calls, or games that are produced by a user's smart phone. The detection module 202, in certain embodiments, uses a microphone, or other sound detection device, to detect the external sounds.

In one embodiment, the external sound includes a PA announcement, a person's voice, music, television audio, and/or the like. In certain embodiments, the external sound includes predefined sound that is only capable of being heard by information handling devices 102. For example, an airline may encode messages in high-frequency sounds, or other signals, that only the detection module 202 can detect. In such an embodiment, the predefined sound may include a message or may include an identifier or key for looking up the message. For example, the airline may maintain a database of messages, information, notifications, or the like, that can be searched using information, e.g., a key, encoded in the high-frequency sound that the detection module 202 detected.

The relevance module 204, in one embodiment, determines that an external sound includes a message that is of interest to the user. In other words, the relevance module 204 determines whether the detected message, notification, or other information provided by the external sound is relevant to what the user is doing so that the user should be interrupted and notified of the external sound. For instance, as described in more detail below, if the external sound includes a message associated with the user's location (e.g., airport terminal, flight gate, grocery store, courthouse, bus terminal, stadium, etc.), or associated with the user's calendar events (e.g., meetings, flights, etc.). The relevance module 204 may consider other factors to determine whether the external sound comprises a message that is relevant to the user, such who is speaking, what produced the external sound, the timing of the external sound, and/or the like.

In some embodiments, the relevance module 204 processes the external sound for data, information, speech, voices, keywords, or the like in the message to determine that the message is of interest to the user. For instance, the relevance module 204 may perform speech or voice recognition, speech-to-text processing, and/or the like. In one example, the relevance module 204 may detect the phrase gate C6 in the message while the user is at an airport. The relevance module 204 may then check the user's emails, text messages, or the like to determine whether the user has any information about gate C6 on their device. If so, the relevance module 204 may determine that the message is of interest to the user and the user should be notified of the message.

The notification module 206, in one embodiment, notifies the user of the message that was included in the external sound in response to determining that the message is of interest to the user. The notification module 206, for example, may interrupt the user, alert the user, or otherwise get the user's attention so that the user can listen to the message in real-time, can listen to a recorded version of the message, can read a transcription of the message, and/or the like. For instance, the notification module 206 may output a captured stream of the external sound to the user's headphones.

Figure 3:
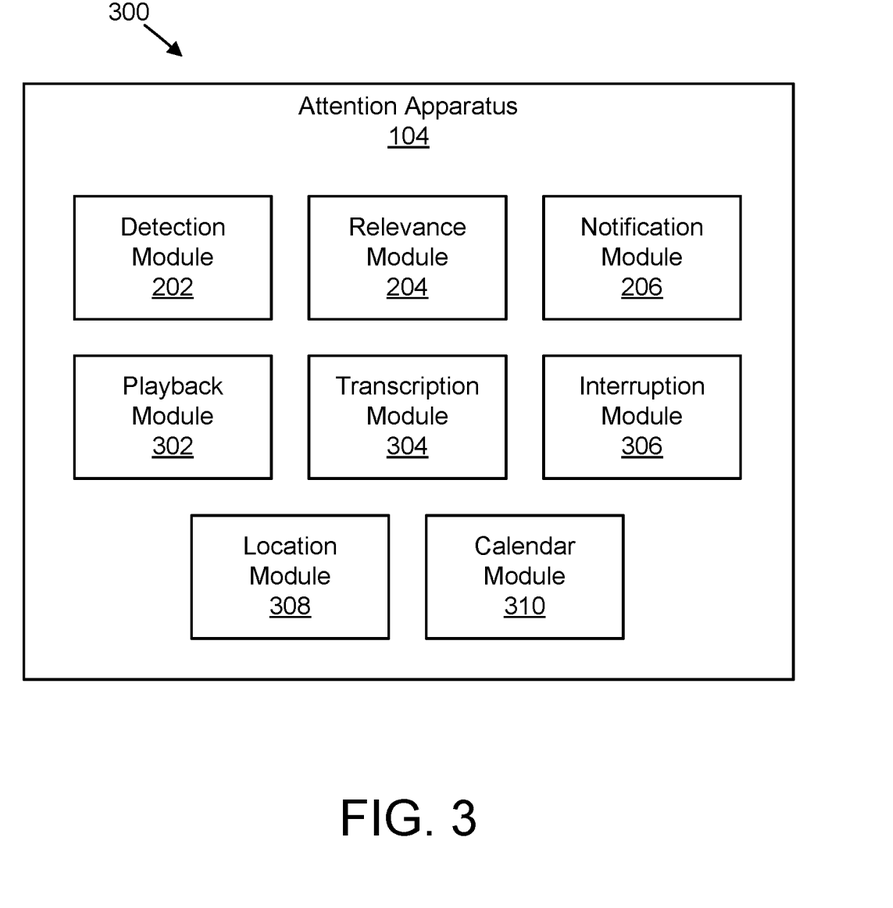
FIG. 3 is a schematic block diagram illustrating one embodiment of another apparatus for notifying a user of external audio.

FIG. 3 is a schematic block diagram illustrating one embodiment of an apparatus 300 for notifying a user of external audio. In one embodiment, the apparatus 300 includes an embodiment of an attention apparatus 104. The attention apparatus 104, in some embodiments, includes one or more of a detection module 202, a relevance module 204, and a notification module 206, which are substantially similar to the detection module 202, the relevance module 204, and the notification module 206 described above with reference to FIG. 2. In a further embodiment, the attention apparatus 104 includes one or more of a playback module 302, a transcription module 304, an interruption module 306, a location module 308, and a calendar module 310, which are described in more detail below.

The playback module 302, in one embodiment, captures the external sound, or the message generated by the external sound, and provides the external sound to the user. In some embodiments, the playback module 302 captures a stream of the external sound and plays the captured stream back to the user. For example, the playback module 302 may capture a live stream, or a real-time stream of the external sound and output the external sound to a private listening device (e.g., headphones) that the user is using to listen to a different audio source.

In a further embodiment, the playback module 302 records the message generated by the external sound and outputs the recorded message to the user, e.g., through the user's private listening device. This differs from the live-stream capture because the live-stream capture may be streamed to the user in real-time, e.g., while the message is being broadcast, instead of being recorded and played back at a later time.

In one embodiment, the transcription module 304 transcribes the message generated by the external sound and electronically presents the message to a user. For example, if a user is watching a movie on a tablet computer while waiting to board a flight, the transcription module 304 may transcribe the message that the detection module 202 detects, and present the message on the user's display as a push notification, text message, email message, chat message, and/or the like.

In certain embodiments, the interruption module 306 interrupts one or more active applications executing on the user's device prior to notifying the user of the message. For example, if the user is listening to music, watching a video, playing a game, or the like, the interruption module 306 may pause the music/video/game, reduce or mute the volume level, turn the screen off, and/or the like, to indicate to the user that a message is currently being announced, is available to view, or the like.

The interruption module 306, in a further embodiment, may notify the user of the message by triggering an action by the user's device to get the user's attention. For example, the interruption module 306 may cause the user's smart phone to vibrate. In another example, the interruption module 306 may cause the user's smart watch to sound an alarm, or generate a different sound. In a further example, the interruption module 306 may cause the user's device to flash a light or a screen.

The location module 308, in one embodiment, determines the user's location. The user's location may be a GPS location, a relative location (e.g., the user's location within an airport such as the gate, the terminal, or the like), an address, or the like, which may be determined based on information from one or more location or mapping services and the sensors in the user's device(s).

Based on the user's location, the relevance module 204 may determine whether the message is of interest to the user. For example, if the location module 208 determines that the user is at gate A1 in an airport, and the detection module 202 detects a message that contains information related to gate A1, then the relevance module 204 may determine that the message is of interest to the user and that the notification module 206 should notify the user of the message.

In a further embodiment, the calendar module 310 checks the user's calendar for one or more calendar events, and determines whether the calendar events are related to the message. For example, if the calendar module 310 determines that the user has a calendar event for boarding a flight at gate B3 at 10:30 AM, and the detection module 202 detects a message that contains information related to gate B3, and possibly additional information regarding the time 10:30 am, then the relevance module 204 may determine that the message is of interest to the user and that the notification module 206 should notify the user of the message.

Figure 4:
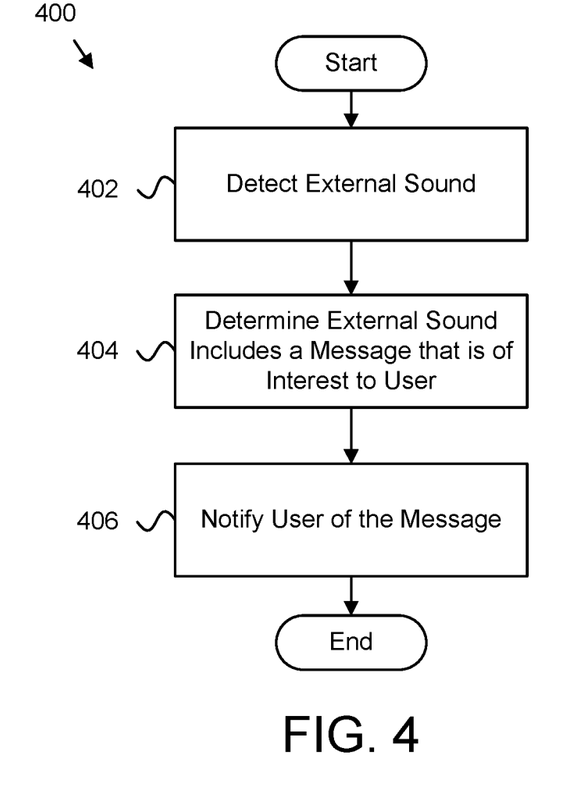
FIG. 4 is a schematic flow chart diagram illustrating one embodiment of a method for notifying a user of external audio.

FIG. 4 is a schematic flow chart diagram illustrating one embodiment of a method 400 for notifying a user of external audio. In one embodiment, the method 400 begins and detects 402 an external sound using a microphone. The method 400, in a further embodiment, determines 404 that the external sound comprises a message that is of interest to the user. In some embodiments, the method 400 notifies 406 the user of the message in response to determining that the message is of interest to the user, and the method 400 ends. In one embodiment, the detection module 202, the relevance module 204, and the notification module 206 perform the various steps of the method 400.

Figure 5:
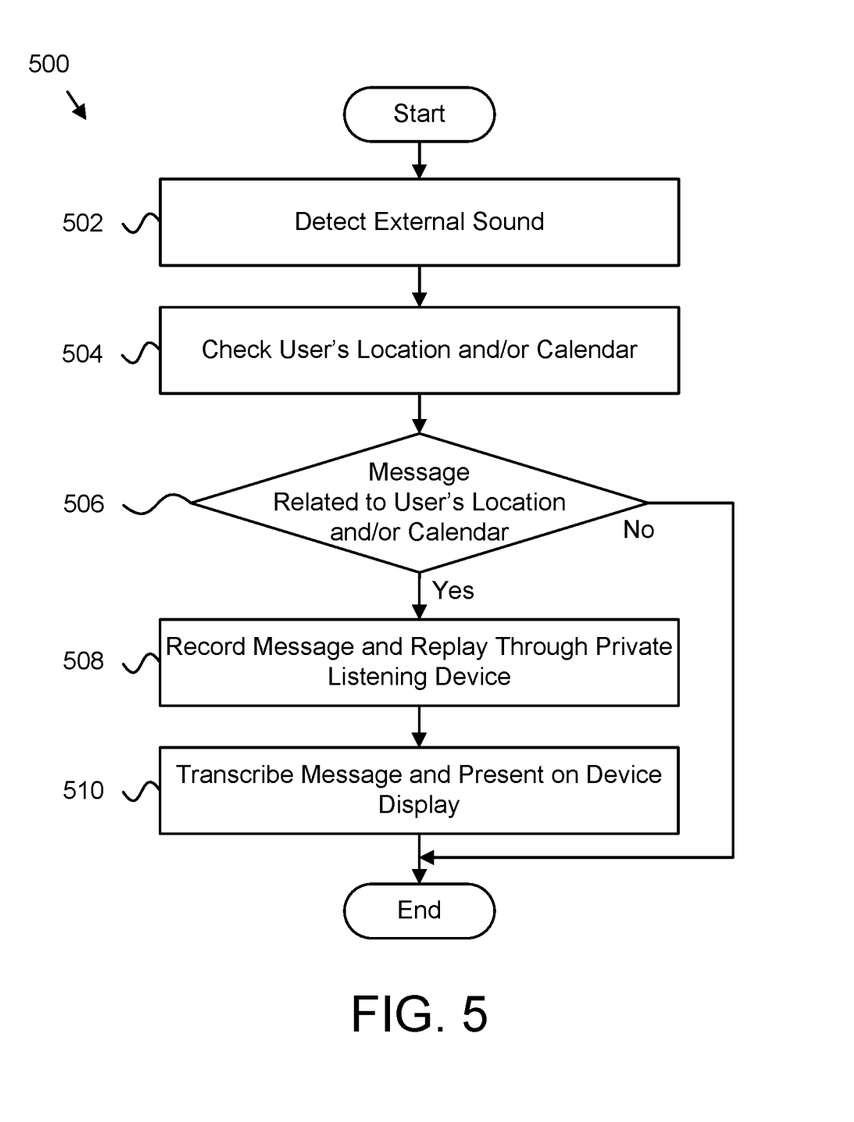
FIG. 5 is a schematic flow chart diagram illustrating one embodiment of another method for notifying a user of external audio.

FIG. 5 is a schematic flow chart diagram illustrating one embodiment of another method 500 for notifying a user of external audio. In one embodiment, the method 500 begins and detects 502 an external sound using a microphone. The external sound may contain a message that In a further embodiment, the method 500 checks 504 a user's location to determine whether the message generated by the external sound is related to the user's location, and/or the user's calendar for events that may be associated with or related to the message. For example, the method 500 may determine that the user is in a restaurant in an airport waiting for her flight at gate A6, and may detect 502 an external sound of a person's voice stating that the flight at gate A6 has been delayed.

In one embodiment, the method 500 determines 506 whether the message is of interest to the user by determining whether the message is related to the user's location and/or calendar events. If the method 500 determines 506 that the message is not related to the user's location or calendar events, the method 500 ends. Otherwise, in some embodiments, the method 500 records 508 the message and replays the message through the user's private listening device, e.g., headphones. In a further embodiment, the method 500 transcribes 510 the message, either in real-time or from the recorded message, and presents the transcribed message on the user's device display, e.g., as a push notification, a text message, an email message, and/or the like.

Continuing with the example above, after detecting 502 the person say that the flight at gate A6 has been delayed, the method 500 may determine that the message is relevant to the user, based on the user's travel itinerary in the user's calendar and/or based on the user's location within the airport, and may present a message to the user of what the other person was saying, and the method 500 ends. In one embodiment, the detection module 202, the relevance module 204, the notification module 206, the playback module 302, the transcription module 304, the location module 308, and the calendar module 310 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a microphone;
   a processor;
   a memory that stores code executable by the processor to:
      detect an external sound using the microphone;
      determine that the external sound comprises a message that is of interest to the user by determining whether the message includes one or more keywords associated with one or more of a location and a calendar event for the user; and
      notify the user of the message in response to determining that the message is of interest to the user by outputting the message through a private listening device that the user is using to listen to a different audio source, the different audio source being interrupted by the outputted message.

2. The apparatus of claim 1, wherein the code is further executable by the processor to record the message in response to determining the message is of interest to the user, the recorded message being output to the private listening device.

3. The apparatus of claim 1, wherein the code is further executable by the processor to:
   transcribe the message; and
   electronically present the transcribed message to the user.

4. The apparatus of claim 1, wherein the code is further executable by the processor to interrupt one or more active applications prior to notifying the user of the message.

5. The apparatus of claim 4, wherein the code is further executable by the processor to interrupt the one or more applications by one or more of pausing the one or more applications, reducing a volume level associated with the one or more applications, and turning off a display.

6. The apparatus of claim 1, wherein the code is further executable by the processor to notify the user of the message by generating one or more of a vibration and an alarm.

7. The apparatus of claim 1, wherein the code is further executable by the processor to:
   determine the user's location; and
   determine that the user's location is related to the message to determine that the message is of interest to the user.

8. The apparatus of claim 1, wherein the code is further executable by the processor to:
   check the user's calendar for one or more events; and
   determine that the one or more events are related to the message to determine that the message is of interest to the user.

9. The apparatus of claim 1, wherein the external sound is selected from the group consisting of an announcement over a public address system, a person's voice, and music.

10. The apparatus of claim 1, wherein the external sound comprises a predefined sound, the predefined sound associated with a specific message, the predefined sound used to lookup the specific message.

11. A method comprising:
    detecting, by a processor, an external sound using a microphone;
    determining that the external sound comprises a message that is of interest to the user by determining whether the message includes one or more keywords associated with one or more of a location and a calendar event for the user; and
    notifying the user of the message in response to determining that the message is of interest to the user by outputting the message through a private listening device that the user is using to listen to a different audio source, the different audio source being interrupted by the outputted message.

12. The method of claim 11, further comprising recording the message in response to determining the message is of interest to the user, the recorded message being output to the private listening device.

13. The method of claim 11, further comprising:
transcribing the message; and
electronically presenting the transcribed message to the user.

14. The method of claim 11, further comprising interrupting one or more active applications prior to notifying the user of the message.

15. The method of claim 11, further comprising:
determining the user's location; and
determining that the user's location is related to the external sound to determine that the message is of interest to the user.

16. The method of claim 11, further comprising:
checking the user's calendar for one or more events; and
determining that the one or more events are related to the message to determine that the message is of interest to the user.

17. A program product comprising a computer readable storage medium that stores code executable by a processor, the executable code comprising code to perform:
detecting an external sound using a microphone;
determining that the external sound comprises a message that is of interest to the user by determining whether the message includes one or more keywords associated with one or more of a location and a calendar event for the user; and
notifying the user of the message in response to determining that the message is of interest to the user by outputting the message through a private listening device that the user is using to listen to a different audio source, the different audio source being interrupted by the outputted message.

* * * * *